United States Patent
McEwen

(10) Patent No.: US 10,041,398 B2
(45) Date of Patent: Aug. 7, 2018

(54) TURBINE

(71) Applicant: Cummins Ltd, Huddersfield (GB)

(72) Inventor: James Alexander McEwen, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 572 days.

(21) Appl. No.: 14/327,659

(22) Filed: Jul. 10, 2014

(65) Prior Publication Data

US 2015/0016963 A1 Jan. 15, 2015

(30) Foreign Application Priority Data

Jul. 12, 2013 (GB) .................................... 1312505.9

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F02B 37/183* (2013.01); *Y02T 10/144* (2013.01)

(58) Field of Classification Search
CPC .......... F02D 23/00; F02B 33/44; F02B 37/12; F02B 39/16; F02B 37/186; F16K 1/48; F01D 17/105

(Continued)

(56) References Cited

U.S. PATENT DOCUMENTS

2005/0079049 A1* 4/2005 Ishihara ................ F02B 37/183
415/182.1

2006/0213195 A1* 9/2006 Leavesley ............... F02B 37/18
60/605.1

(Continued)

FOREIGN PATENT DOCUMENTS

DE 202010005747 A1 9/2010
DE 102011089777 A1 6/2013

(Continued)

OTHER PUBLICATIONS

Search Report issued by the Intellectual Property Office United Kingdom, dated Dec. 11, 2013, for corresponding German Application No. 1312505.9; 3 pages.

(Continued)

*Primary Examiner* — Patrick Maines
(74) *Attorney, Agent, or Firm* — Faegre Baker Daniels LLP

(57) ABSTRACT

A turbine comprises a turbine housing defining a turbine inlet upstream of a turbine wheel and a turbine outlet downstream of the turbine wheel; a wastegate passage connecting the turbine inlet and the turbine outlet; and a wastegate valve comprising a movable valve member. The wastegate valve has an open state and a closed state. The valve member is mounted to an actuation member passing through an actuator conduit of the turbine housing, and movable so as to move the wastegate valve between the open and closed states. The turbine further comprises a sealing arrangement configured to provide a seal arranged to substantially prevent gas from passing from the turbine outlet into the actuator conduit. The sealing arrangement is configured such that when the valve member is urged into the closed state by the actuator member the sealing effectiveness of the sealing arrangement is increased.

16 Claims, 8 Drawing Sheets

(58) Field of Classification Search
USPC .......................................................... 415/145
See application file for complete search history.

(56) References Cited

U.S. PATENT DOCUMENTS

| | | | | |
|---|---|---|---|---|
| 2009/0226304 | A1* | 9/2009 | Frankenstein | F01D 11/003 415/159 |
| 2010/0037605 | A1 | 2/2010 | Garrett et al. | |
| 2012/0228833 | A1* | 9/2012 | Delitz | F01D 17/20 277/500 |
| 2012/0319020 | A1* | 12/2012 | Doehler | F02B 37/183 251/214 |
| 2012/0328416 | A1* | 12/2012 | Igarashi | F01D 17/105 415/159 |
| 2013/0287552 | A1* | 10/2013 | House | F01D 11/003 415/170.1 |
| 2014/0348643 | A1* | 11/2014 | House | F02B 37/186 415/170.1 |
| 2015/0020523 | A1* | 1/2015 | Lombard | F01D 17/105 60/602 |
| 2015/0125272 | A1* | 5/2015 | MacK | F01D 17/105 415/145 |

FOREIGN PATENT DOCUMENTS

| | | |
|---|---|---|
| EP | 0078637 A1 | 5/1983 |
| EP | 2199564 A1 | 6/2010 |
| EP | 2444625 A1 | 4/2012 |
| EP | 2489853 A1 | 8/2012 |
| EP | 2508730 A2 | 10/2012 |
| EP | 2784286 A1 | 10/2014 |
| JP | 05248253 A * | 9/1993 |
| JP | 2005003002 A | 1/2005 |
| WO | WO 2005/008041 A1 | 1/2005 |
| WO | WO 2007/138325 A2 | 12/2007 |

OTHER PUBLICATIONS

Search Report issued by the European Patent Office, dated Nov. 14, 2014, for corresponding European Application No. 14176202.1; 5 pages.

Examination Report dated Nov. 2, 2016, issued by the State Intellectual Property Office of the People's Republic of China for related Application No. 2014103314104; 7 pages.

Examination Report dated Nov. 2, 2016, issued by the State Intellectual Property Office of the People's Republic of China (translated in English language) for related Application No. 2014103314104; 3 pages.

* cited by examiner

TURBINE

TECHNICAL FIELD

The present invention relates to a turbine and in particular to a turbine having a wastegate and sealing arrangement. The turbine may form part of a turbocharger or power turbine.

BACKGROUND AND SUMMARY OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, which uses the rotational energy of the rotor to compress a fluid.

Turbochargers are well known devices for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold. The turbocharger shaft is conventionally supported by journal and thrust bearings, including appropriate lubricating systems, located within a central bearing housing connected between the turbine and compressor wheel housings.

The turbine of a conventional turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurized exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel.

Turbines may be of a fixed or variable geometry type. Variable geometry turbines differ from fixed geometry turbines in that characteristics of the inlet (such as the inlet's size) can be varied to optimize gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the inlet using a variable geometry mechanism. Turbochargers provided with a variable geometry turbine are referred to as variable geometry turbochargers.

Nozzle vane arrangements in variable geometry turbochargers can take different forms. Two known types of variable geometry turbochargers are swing vane turbochargers and sliding nozzle turbochargers.

Generally, in swing vane turbochargers the inlet size (or flow size) of a turbocharger turbine is controlled by an array of movable vanes in the turbine inlet. Each vane can pivot about an axis extending across the inlet parallel to the turbocharger shaft and aligned with a point approximately half way along the vane length. A vane actuating mechanism is provided which is linked to each of the vanes and is displaceable in a manner which causes each of the vanes to move in unison, such a movement enabling the cross sectional area available for the incoming gas and the angle of approach of the gas to the turbine wheel to be controlled.

Generally, in sliding nozzle turbochargers the vanes are fixed to an axially movable wall that slides across the inlet. The axially movable wall moves towards a facing shroud plate in order to close down the inlet and in so doing the vanes pass through apertures in the shroud plate. Alternatively, the nozzle ring is fixed to a wall of the turbine and a shroud plate is moved over the vanes to vary the size of the inlet.

The compressor of a conventional turbocharger comprises a compressor housing defining a compressor chamber within which the compressor wheel is mounted such that it may rotate about an axis. The compressor also has a substantially axial inlet passageway defined by the compressor housing and a substantially annular outlet passageway defined by the compressor housing between facing radially extending walls arranged around the compressor chamber. A volute is arranged around the outlet passageway and an outlet is in flow communication with the volute. The passageways and compressor chamber communicate such that gas (for example, air) at a relatively low pressure is admitted to the inlet and is pumped, via the compressor chamber, outlet passageway and volute, to the outlet by rotation of the compressor wheel. The gas at the outlet is generally at a greater pressure (also referred to as boost pressure) than the relatively low pressure of the gas which is admitted to the inlet. The gas at the outlet may then be pumped downstream of the compressor outlet by the action of the compressor wheel.

It is known to provide a turbocharger turbine with a valve controlled bypass port referred to as a wastegate, to enable control of the turbocharger boost pressure and/or shaft speed. A wastegate valve (typically a poppet type valve) is controlled to open the wastegate port (bypass port) when the boost pressure of the fluid in the compressor outlet increases towards a pre-determined level, thus allowing at least some of the exhaust gas to bypass the turbine wheel. Typically the wastegate port opens into a wastegate passage which diverts the bypass gas flow to the turbine outlet or vents it to atmosphere.

The wastegate valve may be actuated by a variety of means, including electric actuators, but is more typically actuated by a pneumatic actuator operated by boost pressure delivered by the compressor wheel. The wastegate valve actuator is typically connected to the wastegate valve by a linkage, part of which passes through an actuation conduit in the turbine housing. Where the linkage passes through the actuation conduit it is possible that fluid from the turbine outlet may leak into the actuation conduit and then to atmosphere. Leakage of fluid from the turbine outlet to atmosphere may have an adverse effect on the performance of the turbine and hence turbocharger.

According to a first aspect of the present disclosure there is provided a turbine comprising a turbine housing defining a turbine inlet upstream of a turbine wheel and a turbine outlet downstream of the turbine wheel; a wastegate passage connecting the turbine inlet and the turbine outlet; a wastegate valve comprising a movable valve member; the wastegate valve having an open state in which gas may pass between the turbine inlet and turbine outlet via the wastegate passage and a closed state in which the valve member substantially prevents gas from passing between the turbine inlet and the turbine outlet via the wastegate passage; and wherein the valve member is mounted to an actuation member, the actuation member passing through an actuator conduit of the turbine housing, and being movable so as to move the wastegate valve between the open and closed states; the turbine further comprising a sealing arrangement configured to provide a seal arranged to substantially prevent gas from passing from the turbine outlet into the actuator conduit; wherein the sealing arrangement is configured such that when the valve member of the wastegate valve is urged into the closed state by the actuator member the sealing effectiveness of the sealing arrangement is increased.

The wastegate valve may further comprise a valve seat, the valve member contacting the valve seat when the wastegate valve is in the closed state; wherein the actuation member has a longitudinal axis; and wherein the valve seat is angled relative to the longitudinal axis and is configured such that when the actuation member urges the valve member of the wastegate valve into the closed state, the valve seat imparts a force on the valve member which urges the valve member in a first substantially axial direction, and wherein the sealing arrangement is configured such that the urging of the valve member in the first substantially axial direction increases the sealing effectiveness of the sealing arrangement.

The valve member may comprise a surface configured such that, in use, when the wastegate valve is in said open state, gas which passes through the wastegate passage is incident on said surface of the valve member, and wherein the sealing arrangement and valve member are configured such that gas incident on said surface applies a force to the valve member which increases the sealing effectiveness of the sealing arrangement.

The actuation member may have a longitudinal axis and wherein a normal to said surface is non-perpendicular to the longitudinal axis of the actuation member; and the valve member further being configured such that, in use, when the wastegate valve is in said open state, gas which passes through the wastegate passage is incident on said surface of the valve member, the gas incident on said surface applying a force to the valve member which urges the valve member in a first substantially axial direction which increases the sealing effectiveness of the sealing arrangement.

The actuation member may rotate in order to move the wastegate valve between the open and closed states.

The actuator may rotate about its longitudinal axis in order to move the wastegate valve between the open and closed states.

The valve member may be mounted to the actuation member such that the valve member is located on a first side of the actuator conduit, and a portion of the actuation member is mechanically linked to an actuator or linkage configured to be linked to an actuator, wherein the portion of the actuation member which is mechanically linked to the actuator or linkage configured to be linked to the actuator is located on a second side of the actuator conduit.

The sealing arrangement may comprise a seal member.

The sealing arrangement may be configured such that the urging of the actuation member in the first substantially axial direction compresses the seal member.

The seal member may be disposed upon the actuation member.

The seal member may be sandwiched between the valve member and the turbine housing.

The turbine may further comprise a bush, the bush being received by the actuator conduit and the actuation member passing through the bush, and wherein the seal member is sandwiched between the valve member and the bush.

According to a second aspect of the present invention there is provided a turbocharger or power turbine including a turbine according to the first aspect of the present invention.

BRIEF DESCRIPTION OF THE DRAWINGS

A specific embodiment of the present invention will now be described, by way of example only, with reference to the accompanying drawings, in which.

DETAILED DESCRIPTION OF EMBODIMENTS OF THE DISCLOSURE

Figure 1:
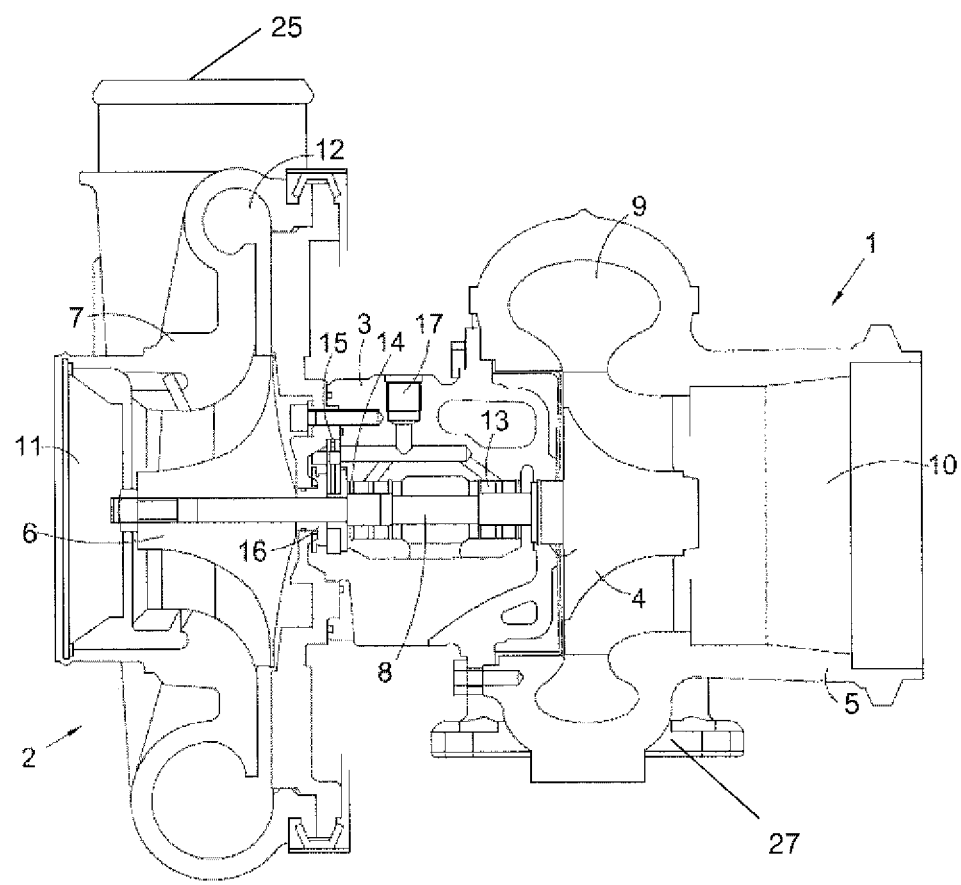
FIG. 1 shows a schematic cross-section through a portion of a known turbocharger.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has an exhaust gas inlet volute 9 located annularly around the turbine wheel 4 and an axial exhaust gas outlet 10. The compressor housing 7 has an axial air intake passage 11 and a volute 12 arranged annularly around the compressor chamber. The volute 12 is in gas flow communication with a compressor outlet 25. The turbocharger shaft 8 rotates on journal bearings 13 and 14 housed towards the turbine end and compressor end respectively of the bearing housing 3. The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways (not shown). The oil fed to the bearing assemblies may be used to both lubricate the bearing assemblies and to remove heat from the bearing assemblies.

In use, the turbine wheel 4 is rotated by the passage of exhaust gas from the exhaust gas inlet 9 to the exhaust gas outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 25.

The exhaust gas inlet 9 is defined by a portion of the turbine housing 5 which includes a turbocharger mounting flange 27 at the end of the exhaust gas inlet 9 remote from the turbine wheel 4.

FIGS. 2 to 5 show various schematic views of portions of a turbocharger 30 which includes a turbine 32 in accordance with an embodiment of the present disclosure. The turbocharger 30 includes all of the features of the turbocharger described above in relation to FIG. 1. The same numbering is used within FIGS. 2 to 5 for features of the turbocharger 30 shown in FIGS. 2 to 5 which are equivalent to features shown in the turbocharger of FIG. 1.

In addition to the features of the turbine shown in FIG. 1, the turbine according to an embodiment of the present invention shown in FIGS. 2 to 5 also includes a wastegate assembly. As can be seen best in FIG. 4, the turbine 32 includes a turbine housing 5 which defines a turbine inlet 9 upstream of the turbine wheel 4, and a turbine outlet 10 downstream of the turbine wheel 4. The wastegate arrangement includes a wastegate passage 34 (indicated schematically in dashed lines) which extends between the turbine inlet 9 and turbine outlet 10, and hence connects the turbine inlet 9 with the turbine outlet 10. The wastegate arrangement also includes a wastegate valve comprising a movable valve member 36 and a valve seat 38. The valve seat 38 can be seen best in FIG. 5 in which the movable valve member of the wastegate valve is omitted so as to aid the clarity of the figure.

Figure 3:
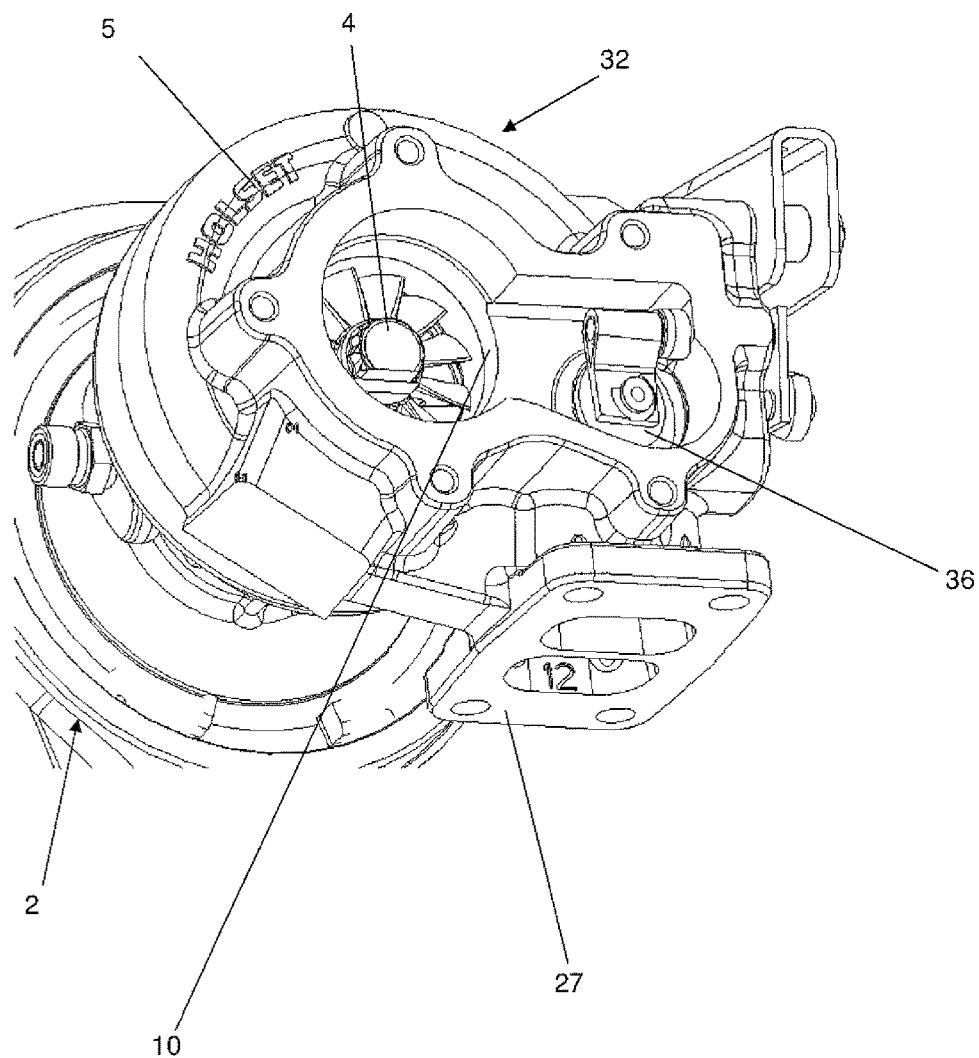
FIG. 3 shows a schematic end-on perspective view of a portion of the turbocharger shown in FIG. 2.
Figure 4:
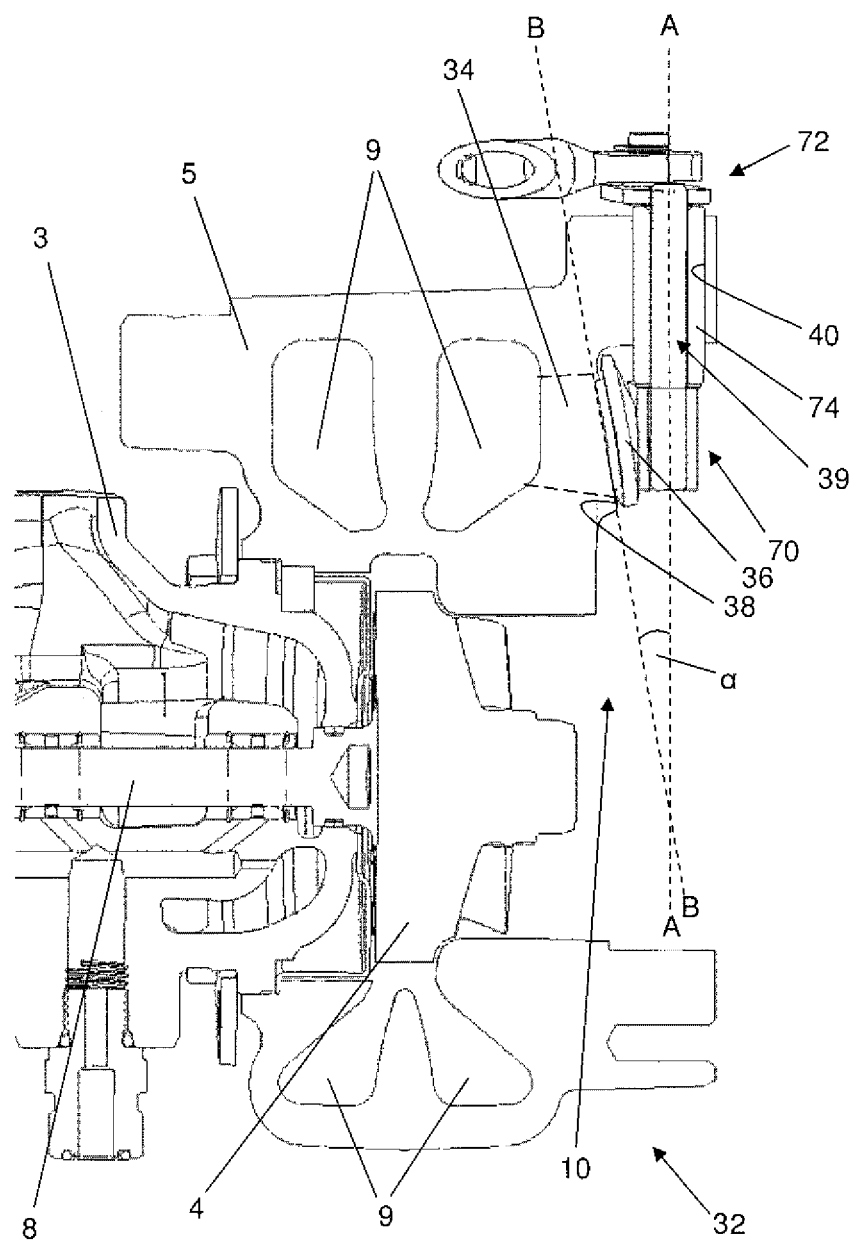
FIG. 4 shows a schematic cross-section through a portion of the turbocharger shown in FIGS. 2 and 3.
Figure 5:
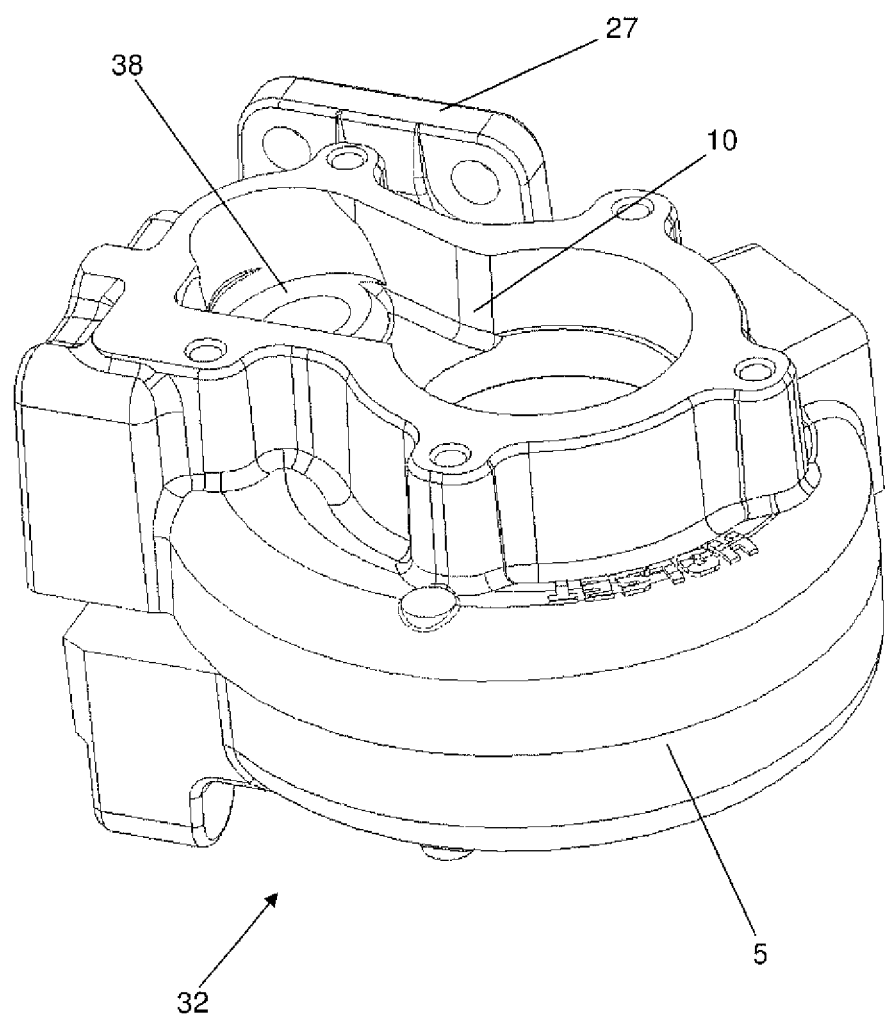
FIG. 5 shows a schematic perspective view of a portion of the turbocharger shown in FIG. 2.
Figure 7:
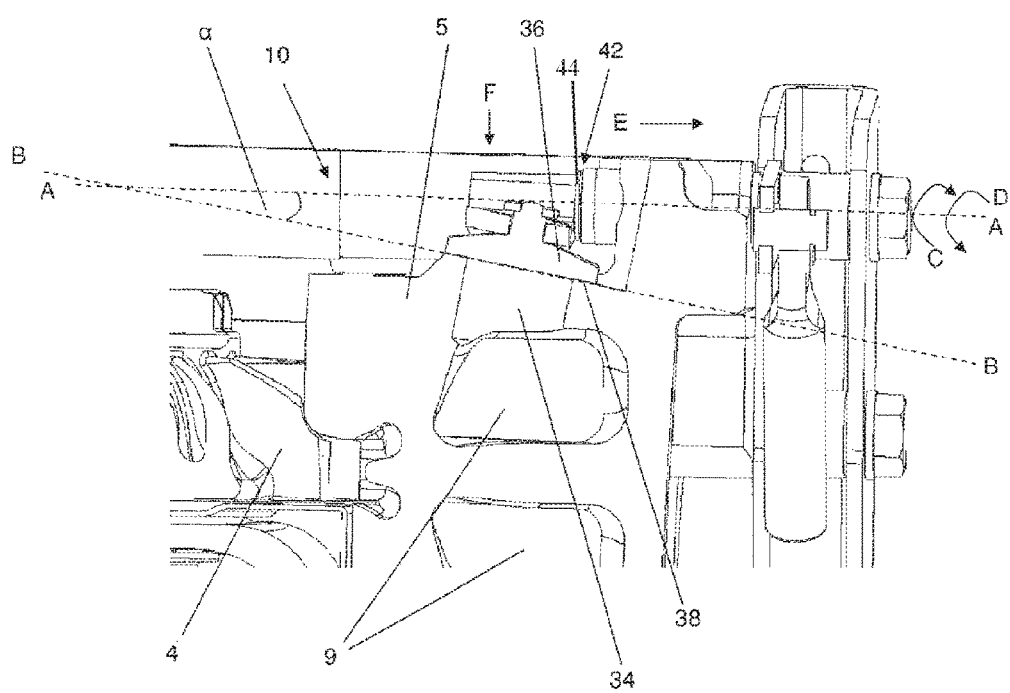
FIG. 7 shows a schematic cross-sectional view of a portion of the turbocharger shown in FIG. 2, wherein a wastegate valve is in a closed state.
Figure 8:
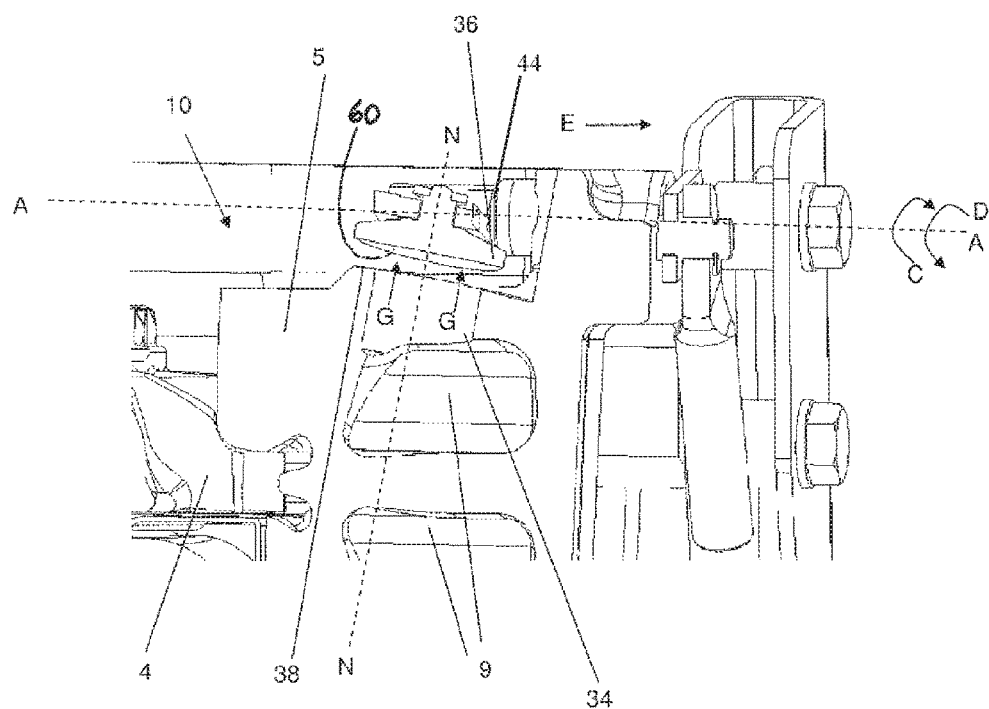
FIG. 8 shows a schematic cross-sectional view of a portion of the turbocharger shown in FIG. 2, wherein a wastegate valve is in an open state.

The wastegate valve (and hence valve member 36) has an open state (as can be seen in FIG. 8) in which gas may pass between the turbine inlet 9 and turbine outlet 10 via the wastegate passage 34. The wastegate valve (and hence valve member 36) also has a closed state (as shown in FIGS. 3, 4 and 7) in which the wastegate valve member 36 contacts the valve seat 38 and thereby in which gas is substantially prevented from passing between the turbine inlet 9 and turbine outlet 10 via the wastegate passage 34.

The valve member 36, which in this embodiment is of a poppet type, is mounted to an actuation member 39 having a longitudinal axis A. The actuation member 39 passes through an actuator conduit 40 of the turbine housing 5. The actuation member 39 is movable so as to move the wastegate valve between the open and closed states and, in particular, so as to move the valve member 36 between corresponding open and closed states.

Figure 2:
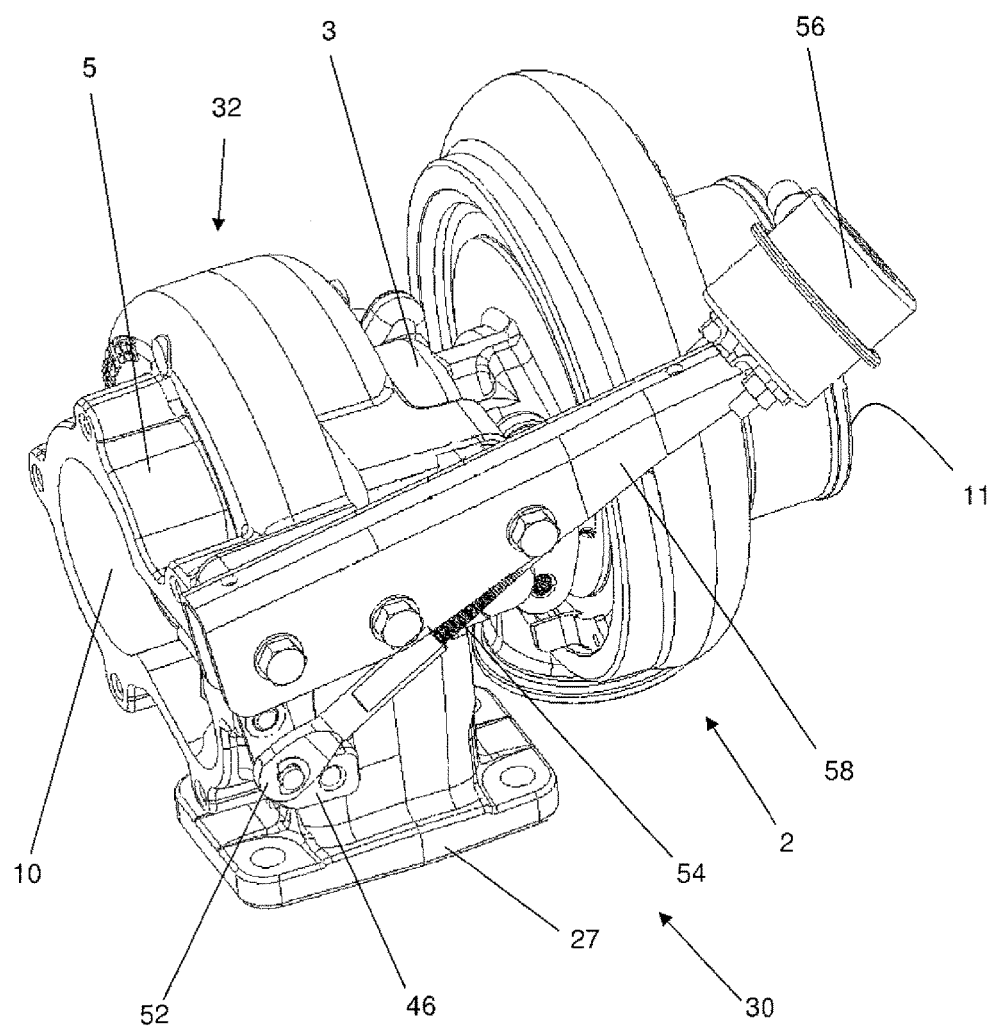
FIG. 2 shows a schematic perspective view of a portion of a turbocharger including a turbine according to the present disclosure.
Figure 6:
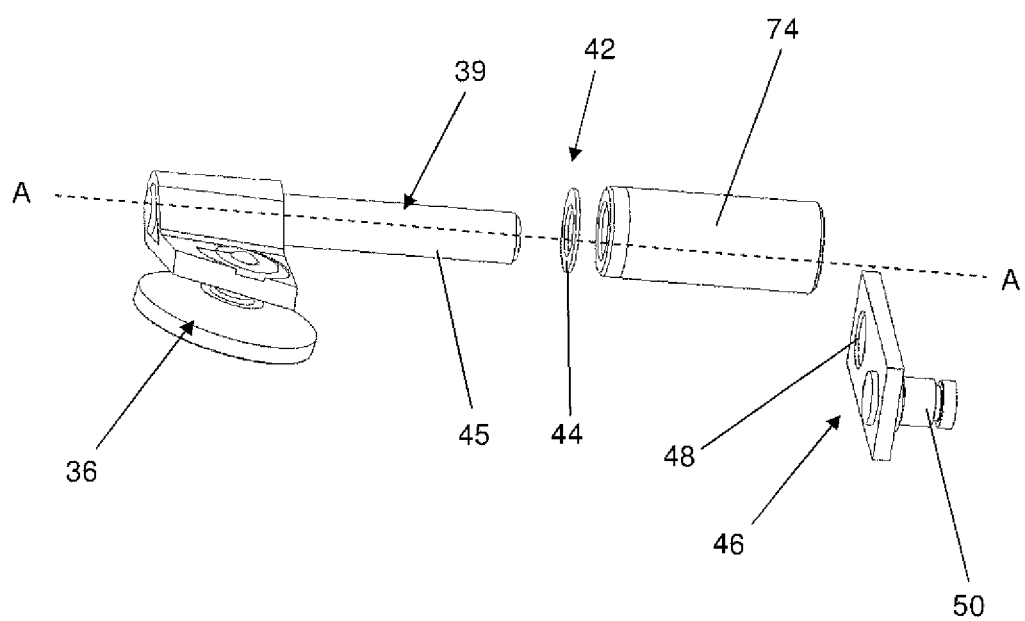
FIG. 6 shows a schematic exploded perspective view of a valve member and actuation member which forms part of the turbocharger in FIG. 2.

The actuation member 39 may be moved in any appropriate manner so as to move the valve member 36 of the wastegate valve between the open and closed states. In the embodiment shown within FIGS. 2 to 8 this is achieved as follows. With particular reference to FIGS. 2 and 6, shaft actuation member 39 includes a generally cylindrical shaft 45 which extends along a longitudinal axis A. The shaft 45 of the actuation member 39 is connected at a first end to the valve member 36. The shaft 45 of the actuation member 39 is connected at a second end to a lever arm 46. Within FIG. 6, the lever arm 46 is shown separated from the shaft 45 in order to aid the clarity of the Figure. In present embodiment, the second end of the shaft 45 of the actuation member 39 is received by a recess 48 of the lever arm 46. Spaced from the recess 48 along the lever arm 46 is a stub 50. The stub 50 is received by a first end 52 of an actuation rod 54. A second end (not shown) of the actuation rod 54 is connected to an actuator 56 which is mounted to the turbine 32 via an actuator mounting arm 58.

In this embodiment, the actuator is a pneumatic actuator; however, any appropriate actuator may be used. The mounting and operation of an actuator (and any associated linkage) in order to move a valve member of a wastegate valve is well-known, and hence further discussion of this is omitted within this description. However, it is worth noting that movement of the actuator rod 54 causes the lever arm 46, and hence attached shaft 45 of the actuation member 39, to pivot about axis A. The pivoting movement of the shaft 45 of the actuation member 39 about the axis A results in the valve member 36 also pivoting about axis A.

The shaft 45 of the actuation member is located within the actuator conduit 40 as follows. A bush 74 is received by the actuator conduit 40 of the turbine housing 5. The bush 74 is generally annular and the shaft 45 of the actuation member passes through the central opening of the annular bush 74.

Within the embodiment shown in FIGS. 2 to 8, the annular seal ring (or seal member) is disposed upon the shaft 45 of the actuation member 39 and is sandwiched between the valve member 36 and the bush 74. In other embodiments, such as those which do not include a bush which locates the actuation member 39 within the actuator conduit, the seal member may be sandwiched between the valve member 36 and the turbine housing 5.

The valve member 36 is mounted to the actuation member 39 such that the valve member 36 is located on a first side of the actuator conduit 40. A portion of the actuator member 39 is mechanically linked to a linkage (actuator lever 46 and actuator rod 54) configured to be linked to an actuator 56. The portion of the actuation member 39 which is mechanically linked to the linkage configured to be linked to the actuator 56, is located on a second side of the actuator conduit 40. Within FIG. 4, the first side of the actuator conduit 40 is indicated generally by 70 and the second side of the actuator conduit 40 is indicated generally by 72.

The valve member 36 can pivot about axis A between an open position as shown in FIG. 8 (in which the valve member 36 is spaced from the valve seat 38) and a closed position as shown in FIG. 7 (in which the valve member 36 contacts the valve seat 38).

Referring to FIGS. 7 and 8, it can be seen that, within the present embodiment, the valve member 36 moves from the closed position shown in FIG. 7 to the open position shown in FIG. 8 by moving upwards, via rotation of the shaft 45 of the actuation member about axis A in the direction of arrow C. Conversely, in order to move the valve member 36 from the open state of the wastegate valve shown in FIG. 8 to a closed state corresponding to a closed state of the wastegate valve as shown in FIG. 7, the shaft 45 of the actuation member is rotated in the direction D about the axis A.

The turbine of the present disclosure further includes a sealing arrangement 42 which is configured to provide a seal arranged to substantially prevent gas from passing between the turbine outlet 10 and the actuator conduit 40. In particular, the sealing arrangement 42 is configured to provide a seal arranged to substantially prevent gas from passing from the turbine outlet 10 into the actuator conduit 40. In the embodiment shown, the sealing arrangement 42 includes an annular seal ring 44. It will be appreciated that in other embodiments the sealing arrangement may have any appropriate configuration provided that it is capable of substantially preventing gas from passing between the turbine outlet 10 and the actuator conduit 40.

The valve seat 38 is angled relative to the longitudinal axis A. This can be seen best in FIGS. 4 and 7. Within these figures it can be seen that the valve seat 38 is located in a plane which includes line B. The angle subtended between the longitudinal axis A of the actuation member 39 and the valve seat 38 (i.e. between the longitudinal axis A and the plane within which the valve seat 38 is located) is the angle α which is subtended between axis A and line B.

Due to the fact that the valve seat 38 is angled relative to the longitudinal axis A of the actuation member 39, when the actuation member 39 urges the valve member 36 into the closed state (as shown in FIG. 7), the valve seat 38 imparts a force on the valve member 36 which urges the valve member 36 in a first substantially axial direction E. Likewise, when the actuation member 39 urges the valve member 36 into the closed state, the valve seat 38 imparts a force on the actuation member 39 via the valve member 36 which urges the actuation member 39 in the first substantially axial direction E.

In more detail, if the valve member 36 of the wastegate valve is in a closed state as shown in FIG. 7, and the valve member 36 is urged in the direction F by the rotation of the shaft 45 of the actuation member in the direction D so as to effect movement of the valve member 36 into the closed state, the angled nature of the valve seat 38 relative to the longitudinal axis A of the actuation member 39 will result in a reaction force being applied by the valve seat 38 to the valve member 36 (and to the actuation member 39 via the valve seat 38) which has a component that urges the valve member 36 (and hence the actuation member 39) in the first substantially axial direction E.

The sealing arrangement 42 is configured such that the urging of the actuation member 39 in the first substantially axial direction E increases the sealing effectiveness of the sealing arrangement. That is to say, urging of the actuation member 39 in the first substantially axial direction E will increase the effectiveness of the sealing arrangement in substantially preventing gas from passing between the turbine outlet 10 and the actuator conduit 40 (e.g. from the turbine outlet 10 into the actuator conduit 40). In the present embodiment the urging of the actuation member 39 in the direction E will increase the sealing effectiveness of the sealing arrangement because urging the actuator member 39 in the direction E will result in the seal ring 44 of the sealing arrangement 42 being compressed, thereby increasing the sealing effectiveness of the seal ring 44.

The valve member 36 and actuation member 39 are also configured such that when the wastegate valve (and hence valve member 36) is in the open state, the passage of gas through the wastegate passage 34 also results in increased sealing effectiveness of the sealing arrangement. This is achieved in this embodiment as follows. Referring to FIG. 8, in use, gas passing through the wastegate passage 34 from the turbine inlet 9 to the turbine outlet 10 will flow in a general direction indicated by arrows G. The valve member 36 comprises a surface 60. The normal N to the surface 60 when the valve member 36 is in the open state (i.e. such that gas can flow through the wastegate passage 34 between the turbine inlet 9 and turbine outlet 10) is non-perpendicular to the longitudinal axis A of the actuation member 39.

In use, when the wastegate valve (and hence valve member 36) is in said open state, gas which passes through the wastegate passage 34 is incident on the surface 60 of the valve member 36 such that the gas incident on the surface 60 applies a force to the valve member 36 which has a component which urges the valve member 36 and actuation member 39 in the first substantially axial direction E. As previously discussed, urging the valve member 36 and actuation member 39 in the first substantially axial direction E will result in an increase in the sealing effectiveness of the sealing arrangement in substantially preventing gas from passing between the turbine outlet 10 and the actuator conduit 40.

It is to be appreciated that numerous modifications to the above-described embodiments may be made without departing from the scope of the disclosure as defined in the appended claims.

Although the previous description is related to an embodiment of a turbine according to the present disclosure which forms part of a turbocharger, it will be appreciated that a turbine according to the present disclosure may form part of any appropriate turbomachine. For example, a turbine according to the present disclosure may form part of a turbomachine which does not include a compressor. In particular, a turbine according to the present disclosure may form part of a power turbine, for example a power turbine which converts the rotation of a turbine wheel into electrical power.

Although the above described embodiment relates to a turbine which operates in conjunction with gas, it will be appreciated that turbines according to the present disclosure may operate in conjunction with any appropriate fluid, for example a liquid. The wastegate valve within the above described embodiment includes a poppet type valve, which is actuated such that substantially linear movement of an actuator is converted by a linkage to rotation of an actuator member which results in movement of the valve member of the wastegate valve between open and closed positions. It will be appreciated that any appropriate wastegate valve may be used, provided it has an open state in which gas may pass between the turbine inlet and turbine outlet via a wastegate passage and a closed state in which gas is substantially prevented from passing between the turbine inlet and the turbine outlet via the wastegate passage. Likewise, any appropriate configuration of actuation of the wastegate valve may be used provided it is capable of effecting a change of state of the wastegate valve between the open and closed states.

Although the above described embodiment includes a sealing arrangement which comprises a seal ring, it will be appreciated that any configuration of seal arrangement may be used, provided that the seal arrangement is arranged to substantially prevent gas from passing between the turbine outlet and the actuator conduit, and provided that the sealing effectiveness of the sealing arrangement increases when the wastegate valve is urged into the closed state. For example, the seal arrangement may comprise a seal member of any appropriate size and/or shape. Furthermore, the seal member may be formed of any appropriate material.

What is claimed is:

1. A turbine comprising:
    a turbine housing defining a turbine inlet upstream of a turbine wheel and a turbine outlet downstream of the turbine wheel;
    a wastegate passage connecting the turbine inlet and the turbine outlet;
    a wastegate valve comprising a movable valve member;
    the wastegate valve having an open state in which gas may pass between the turbine inlet and turbine outlet via the wastegate passage and a closed state in which the valve member inhibits gas from passing between the turbine inlet and the turbine outlet via the wastegate passage; and wherein the valve member is coupled to an actuation member, the actuation member passing through an actuator conduit of the turbine housing, and being movable so as to move the wastegate valve between the open and closed states;

the turbine further comprising a sealing arrangement having a seal arranged to inhibit gas from passing from the turbine outlet into the actuator conduit;

wherein the seal is compressible in a first axial direction defined by a longitudinal axis of the actuation member;

wherein the wastegate valve further comprises a valve seat, the valve member contacting the valve seat when the wastegate valve is in the closed state; and wherein the valve seat is angled in the direction of the longitudinal axis, such that as a result of the actuation member urging the valve member of the wastegate valve into the closed state, the valve seat imparts a reaction force on the valve member, which has a component that urges the actuation member in the first axial direction, thereby compressing the seal, thereby increasing a sealing effectiveness of the sealing arrangement with respect to the actuator conduit.

2. The turbine according to claim 1, wherein the valve member comprises a surface configured such that, in use, when the wastegate valve is in said open state, gas which passes through the wastegate passage is incident on said surface of the valve member, and wherein the sealing arrangement and valve member are configured such that gas incident on said surface applies a force to the valve member which increases the sealing effectiveness of the sealing arrangement.

3. The turbine according to claim 2, wherein an axis normal to said surface is non-perpendicular to the longitudinal axis of the actuation member.

4. The turbine according to claim 1, wherein the actuation member rotates in order to move the wastegate valve between the open and closed states.

5. The turbine according to claim 4, wherein the actuation member rotates about its longitudinal axis in order to move the wastegate valve between the open and closed states.

6. The turbine according to claim 1, wherein the valve member is mounted to the actuation member such that the valve member is located on a first side of the actuator conduit, and a portion of the actuation member is mechanically linked to one of an actuator and a linkage linked to an actuator, wherein the portion of the actuation member is located on a second side of the actuator conduit.

7. The turbine according to claim 1, wherein the seal is disposed upon the actuation member.

8. The turbine according to claim 1, wherein the seal is sandwiched between the valve member and the turbine housing.

9. The turbine according to claim 1, wherein the turbine further comprises a bush, the bush being received by the actuator conduit and the actuation member passing through the bush, and wherein the seal is sandwiched between the valve member and the bush.

10. A turbocharger, comprising:
a turbine having a housing defining a turbine inlet upstream of a turbine wheel and a turbine outlet downstream of the turbine wheel;

a wastegate passage connecting the turbine inlet and the turbine outlet;

a wastegate valve comprising a movable valve member and a valve seat, wherein the valve seat is angled in the direction of a longitudinal axis of an actuation member;

the wastegate valve having an open state in which gas may pass between the turbine inlet and turbine outlet via the wastegate passage and a closed state in which the valve member inhibits gas from passing between the turbine inlet and the turbine outlet via the wastegate passage;

the actuation member coupled to the valve member and passing through an actuator conduit of the turbine housing, and being movable so as to move the wastegate valve between the open and closed states; and a sealing arrangement having a seal compressible in a first axial direction defined by the longitudinal axis of the actuation member, and arranged to inhibit gas from passing from the turbine outlet into the actuator conduit;

wherein the seal is configured such that as a result of the valve member of the wastegate valve being urged into the closed state by the actuator member, the valve member contacts the valve seat and the valve seat imparts a reaction force on the valve member, which has a component that urges the actuation member in the first axial direction, thereby compressing the seal, thereby increasing a sealing effectiveness of the sealing arrangement with respect to the actuator conduit.

11. The turbocharger according to claim 10, wherein the valve member comprises a surface oriented such that, when the wastegate valve is in said open state, gas which passes through the wastegate passage is incident on said surface of the valve member, and wherein the sealing arrangement and valve member are configured such that gas incident on said surface applies a force to the valve member which increases the sealing effectiveness of the sealing arrangement.

12. The turbocharger according to claim 11, wherein an axis normal to said surface is non-perpendicular to the longitudinal axis of the actuation member; and the valve member further being configured such that, in use, when the wastegate valve is in said open state, gas which passes through the wastegate passage is incident on said surface of the valve member, the gas incident on said surface applying a force to the valve member which urges the valve member in the first axial direction.

13. The turbocharger according to claim 10, wherein the actuation member rotates in order to move the wastegate valve between the open and closed states.

14. The turbocharger according to claim 13, wherein the actuation member rotates about its longitudinal axis in order to move the wastegate valve between the open and closed states.

15. The turbocharger according to claim 10, wherein the valve member is mounted to the actuation member such that the valve member is located on a first side of the actuator conduit, and a portion of the actuation member is mechanically linked to one of an actuator and a linkage linked to an actuator, wherein the portion of the actuation member is located on a second side of the actuator conduit.

16. The turbocharger according to claim 10, wherein the seal is disposed upon the actuation member.

* * * * *